(12) United States Patent
Goyet

(10) Patent No.: US 8,430,323 B2
(45) Date of Patent: Apr. 30, 2013

(54) ELECTRONIC DEVICE AND ASSOCIATED METHOD

(75) Inventor: Christophe Goyet, Oak Hill, VA (US)

(73) Assignee: Oberthur Technologies of America Corp., Chantilly, VA (US)

(*) Notice: Subject to any disclaimer, the term of this patent is extended or adjusted under 35 U.S.C. 154(b) by 819 days.

(21) Appl. No.: 12/483,498

(22) Filed: Jun. 12, 2009

(65) Prior Publication Data

US 2010/0314451 A1 Dec. 16, 2010

(51) Int. Cl.
*G06K 19/06* (2006.01)
*G06K 7/06* (2006.01)
*G06K 7/08* (2006.01)

(52) U.S. Cl.
USPC .......................... 235/492; 235/441; 235/451

(58) Field of Classification Search .................. 235/375, 235/380, 381, 382, 492, 441, 451
See application file for complete search history.

(56) References Cited

U.S. PATENT DOCUMENTS

| 4,798,947 | A | * | 1/1989 | Baxter | 250/201.2 |
|---|---|---|---|---|---|
| 4,879,645 | A | * | 11/1989 | Tamada et al. | 235/380 |
| 5,550,919 | A | * | 8/1996 | Kowalski | 705/65 |
| 6,105,874 | A | * | 8/2000 | Berger et al. | 235/492 |
| 6,726,108 | B1 | * | 4/2004 | Guion | 235/492 |
| 6,899,277 | B2 | * | 5/2005 | Kawano et al. | 235/492 |
| 8,109,445 | B2 | * | 2/2012 | Sawada et al. | 235/492 |
| 2003/0057272 | A1 | * | 3/2003 | Bidan et al. | 235/380 |
| 2004/0250037 | A1 | * | 12/2004 | Takemura et al. | 711/164 |
| 2006/0113381 | A1 | * | 6/2006 | Hochstein et al. | 235/382 |
| 2006/0283960 | A1 | * | 12/2006 | Top | 235/492 |

* cited by examiner

*Primary Examiner* — Thien M Le
*Assistant Examiner* — April Taylor
(74) *Attorney, Agent, or Firm* — Young & Thompson

(57) ABSTRACT

An electronic device that includes a first and second interfaces adapted to establish communication with an external electronic entity, an element for processing a secret value, that is adapted to react to reception of a message via either interface, and a control element adapted to update an indicator of use of the element for using a secret value via either interface, to apply a first inhibition to communication using the first interface as a function of the indicator, and to apply a second inhibition to communication using the second interface as a function of the indicator, wherein for at least one value of the indicator the second inhibition is different from the first.

20 Claims, 3 Drawing Sheets ics having two interfaces and means for processing a secret
ELECTRONIC DEVICE AND ASSOCIATED METHOD The present invention concerns an electronic device and an associated method. It applies in particular to electronic entities having two interfaces and means for processing a secret item of data, for example means for authentication of the user.

BACKGROUND OF THE INVENTION

An electronic entity, such as a smart card, for example, which generally includes electronic circuits able to store information, includes means for communication with the exterior, in order in particular to exchange information held by the electronic entity with external devices, of the reader or terminal type.

Of the communication means widely used, a distinction is made between contact communication means, for which physical electrically conductive contact between the electronic entity and the terminal is a necessary condition for setting up communication, and remote (or contactless) communication means, thanks to which communication between the electronic entity and a reader is possible without physical contact between these two elements, by way of communication by means of an electromagnetic wave, generally with a range of the order of a few centimeters.

The use of error (or fault) counters in a secured microcircuit is known. These error counters are used, for example, in smart cards to monitor the use of a personal identification number (PIN).

For example, if an incorrect PIN is received by the card, a fault counter is incremented by one. If the next PIN is correct, the fault counter is reset to zero. If not, the counter is incremented again. In this way, the fault counter retains a count of the number of successive incorrect PINs. When the value of this counter reaches a certain limit, use of the card is blocked.

The cards are generally provided with a mechanism that authorizes access, by way of different secret codes, for unblocking a blocked card. These secret codes are normally held by the provider of the card, for example a bank. Thus the cardholder can (and must) turn to the provider of the card or a similar authority to unblock their card.

There is also known from the document WO 2007/012738 an electronic entity having contact communication means and remote communication means, together with means for authorizing an exchange via the remote communication means as a function of the previous reception of an instruction via the contact communication means, where appropriate with verification that an activation item of information is equal to a predetermined value.

A drawback of these procedures is apparent in the case of cards having a contactless interface, or more generally an interface that is easily accessible or more easily accessible than a second contact interface. An attacker could use the easily accessible interface to send a series of authentication requests with incorrect authentication codes, which would have the consequence of blocking the card without the cardholder being informed of it (denial of service (DoS) attack).

Such an attack effected on a large scale can cause considerable damage to cardholders and to card providers obliged to intervene to unblock cards blocked in this way.

SUMMARY OF THE INVENTION

Thus the invention aims to prevent or to impede such an attack aiming to render the mobile electronic entity incapable of responding to the requests of its user.

In this context, there is known from the document WO 2008/096078 a mobile electronic device including two interfaces and security means adapted to detect a type of attack and to prevent communication using one of the two interfaces, each interface having its own failure counter.

To solve the problems referred to, there is proposed an electronic device characterized in that it includes
  a first interface adapted to establish communication with an external electronic entity
  a second interface also adapted to establish communication with an external electronic entity,
  means for using a secret value, adapted to react to reception of a message via either interface
  control means adapted
    to update an indicator of use of said means for using a secret value via either interface,
    to apply a first inhibition to communication using the first interface as a function of said indicator,
    to apply a second inhibition to communication using the second interface as a function of said indicator,
  the device being such that for at least one value of the indicator, the second inhibition is different from the first.

The use of the secret value is secured, since the two different interfaces are protected by inhibitions, and moreover, thanks to the presence of an indicator value for which one of the interfaces is inhibited differently from the other, the user retains access to the secret value even in the case of enhanced protection caused by a denial of service type attack.

According to one advantageous feature, the means for using a secret value include security means adapted to authorize access to a function of the mobile electronic device in reaction to a successful authentication.

Thus the device is associated with a particular user or a particular other device (a machine), which must be authenticated before a protected function of the device can be used.

According to one feature, the control means are further adapted to update an indicator of incorrect use of said means for using a secret key via either interface.

Thus only characteristics of incorrect use, evaluated on the basis of predefined rules of use, possibly including a count of the number of occurrences of incorrect use, can be used to define the indicator.

According to one advantageous feature, the indicator is a count of incorrect uses of the security means via either interface.

According to one advantageous feature, for at least one value of the indicator, communication using the second interface is blocked, but communication using the first interface is authorized.

Thanks to the presence of an indicator value for which the first of the interfaces is blocked but not the other, the user retains access to the function of the electronic device even in the case of disconnection of an interface following a denial of service attack.

According to one advantageous feature, the control means are adapted
  to apply said first inhibition if said indicator exceeds a first threshold, and
  to apply said second inhibition if said indicator exceeds a second threshold higher than the first threshold.

The presence of two different thresholds enables definition of a range of finite length of values of the indicator in which one inhibition is applied but not the other, thus protecting the mobile electronic device without blocking access by the user to the function or the secret value.

According to one advantageous feature, at least one of the two inhibitions includes application of a time-delay following incorrect use of the means for using a secret value, communication with said means for using a secret value via the corresponding interface being delayed during said time-delay and the time-delay increasing at an increasing rate with the count.

Use of an inhibition in the form of a delay protects the mobile electronic device without blocking access by the user to the function or the secret value, since the user can wait for the end of the delay and then use the interface.

Alternatively, one of the inhibitions can include reduction of the range of communication via a contactless interface, for example through scrambling or slowing the bit rate via the interface.

According to another advantageous feature, each of the two inhibitions includes application of a time-delay after incorrect use of the means for using a secret value, communication with said means for using a secret value via the corresponding interface being delayed during said time-delay, the time-delay increasing at an increasing rate with the count, and the time-delay applied at the second interface being at least twice the time-delay applied at the first interface for the same count.

This feature secures both interfaces, whilst enabling a user to recover the use of each of the two interfaces by waiting long enough, and by making one of the interfaces more available to the user than the other.

In some embodiments, the second interface is more accessible to an attack, for example of the denial of service type, than the first interface.

Thus the invention protects the device firstly against attacks targeting the more accessible interface, since for at least one count value communication via the less accessible second interface is authorized.

In one beneficial embodiment, the control means are adapted to count successive failures of authentication, the device being adapted to initialize the indicator in reaction to detection of a successful authentication.

This feature shows, when authentication has succeeded, that an authorized user has used the device, and that it is not necessary to block the device immediately if the security means are used incorrectly thereafter on the next use.

In one embodiment, the counting means are adapted to count authentication failures within a continuous period of time of predefined length.

The means for using a secret value advantageously use a personal identification secret code.

Alternatively, the security means use a cryptographic key or biometric data. These different security means can be combined.

Said second interface advantageously includes data receiving means using a contactless communication protocol, for example one conforming to the ISO 14443 standard.

According to one advantageous feature, said first interface includes means for receiving data using a contact communication protocol, for example using a protocol conforming to the ISO 7816 standard.

In different embodiments, the device is a smart card or a USB key.

The device can moreover conform to the FIPS or to the common criterion standard.

The invention also proposes a method of using a mobile electronic device having first and second interfaces, or preferably of securely accessing a function of such a device, characterized in that it includes steps of counting uses of means for using a secret value via either interface up to a first counting threshold
inhibiting communication using the second interface
counting incorrect uses up to a second threshold higher than the first threshold
inhibiting communication using the first interface.

Thanks to the use of this method, the use of the secret value is secured, since the two different interfaces are protected by inhibitions, and moreover, thanks to the presence of a count value for which one of the interfaces is inhibited differently from the other, the user retains access to the secret value even in the case of enhanced protection caused by a denial of service type attack.

In some applications of the method of the invention, as a function of the uses made of the device, the method also includes steps of requesting an identification code from the user and of verifying that an identification code provided by the user via the contactless interface is correct.

In the case of a positive result, access to a function is opened, and in the case of a negative result, in the context of counting, a failed attempt counter is incremented.

BRIEF DESCRIPTION OF THE DRAWINGS

In some embodiments of the method, only incorrect uses are counted.

DETAILED DESCRIPTION OF THE PREFERRED EMBODIMENTS

Figure 1:
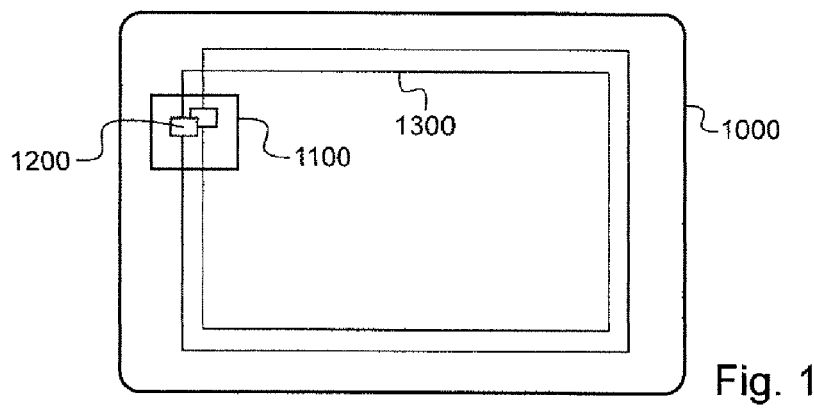
FIG. 1 shows an electronic entity of one embodiment of the invention.

Referring to FIG. 1, the microcircuit card 1000 further includes a microcontroller 1100, flush contacts 1200 on the surface of the card 100 conforming to the ISO 7816 standard and an antenna 1300. The microcontroller is also able to exchange input and output information either via the flush contacts 1200 or via the antenna 1300.

The microcontroller 1100 is electrically powered by an alternating magnetic field via the antenna 1300 or via the flush contacts 1200. It can also be powered by an internal energy source.

Having two communication interfaces, the card 1000 is referred to as dual card.

It is notably adapted to use, via the antenna 1300, a contactless communication protocol designed for communicating at distances up to 20 centimeters, for example according to the ISO 14443 standard or the NFC (Near Field Communication) standard or the ZigBee™ protocol for communication at greater distances, of a few meters.

Figure 2:
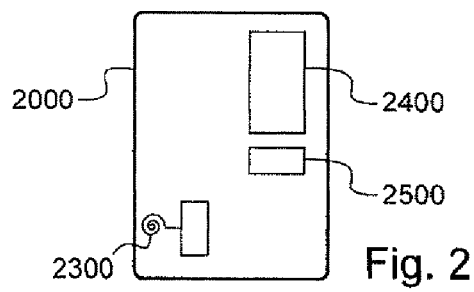
FIG. 2 represents an electronic terminal able to communicate with an electronic entity of the invention.
Figure 3:
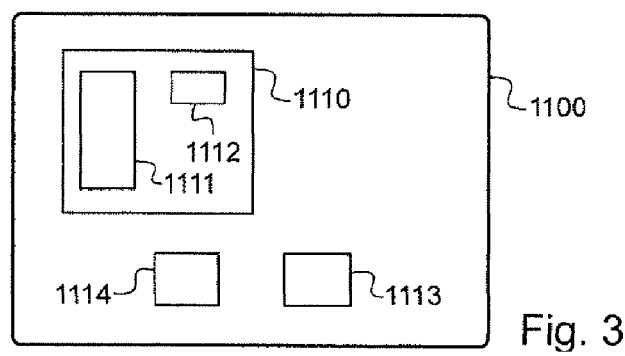
FIG. 3 represents diagrammatically an electronic component included in an electronic entity of the invention.

Referring to FIG. 2, the terminal 2000 is a contactless payment terminal which includes a screen 2400, a keyboard 2500 and a contactless radio interface 2300.

The microcontroller 1110 of the card 1000 and the terminal 2000 are adapted to communicate via the antenna 1300 and the radio interface 2300 using a communication protocol conforming to the appropriate standards, for example those referred to above.

The microcontroller 1100 contains in its non-volatile memory instructions relating to an application 1110, which can be an operating system or any other application, itself including different linked or independent application modules. The non-volatile memory can be a read-only memory (ROM), for example.

The application 1110 includes a module or code 1112 for verifying a personal identification number (PIN). The microcontroller includes a register 1114 storing the PIN associated with the microcircuit card 1000. This register can be stored in a rewritable non-volatile memory, for example an EEPROM (Electrically Erasable Programmable Read Only Memory) or a flash memory, or where appropriate in a read-only memory.

The application 1110 includes a function 1111 whose execution by the microcontroller 1100 is conditioned by the successful communication of the personal identification number (PIN) to the microcontroller 1100 via one of the communication interfaces.

This function 1111 can be execution of a software application (autonomous or included in a wider application) stored in the microcontroller 1100 or access to a memory of the microcontroller 1100. It can be a payment application, for example for effecting a transaction conforming to the Europay Mastercard Visa (EMV) standard.

The microcontroller 1100 also includes a register 1113 (or memory register) storing a number of successive incorrect communications of a PIN, as detected by the PIN verification code 1112. This register 1113 can be stored in a rewritable non-volatile memory, for example an EEPROM or a Flash memory.

All instances of erroneous communication are counted in this way, whether using the antenna 1300 or the flush contacts 1200.

In one illustrative embodiment, the content of the register 1113 is initialized to the maximum acceptable number of failures (which can be set at the value 3, for example), beyond which the card is blocked.

Figure 4:
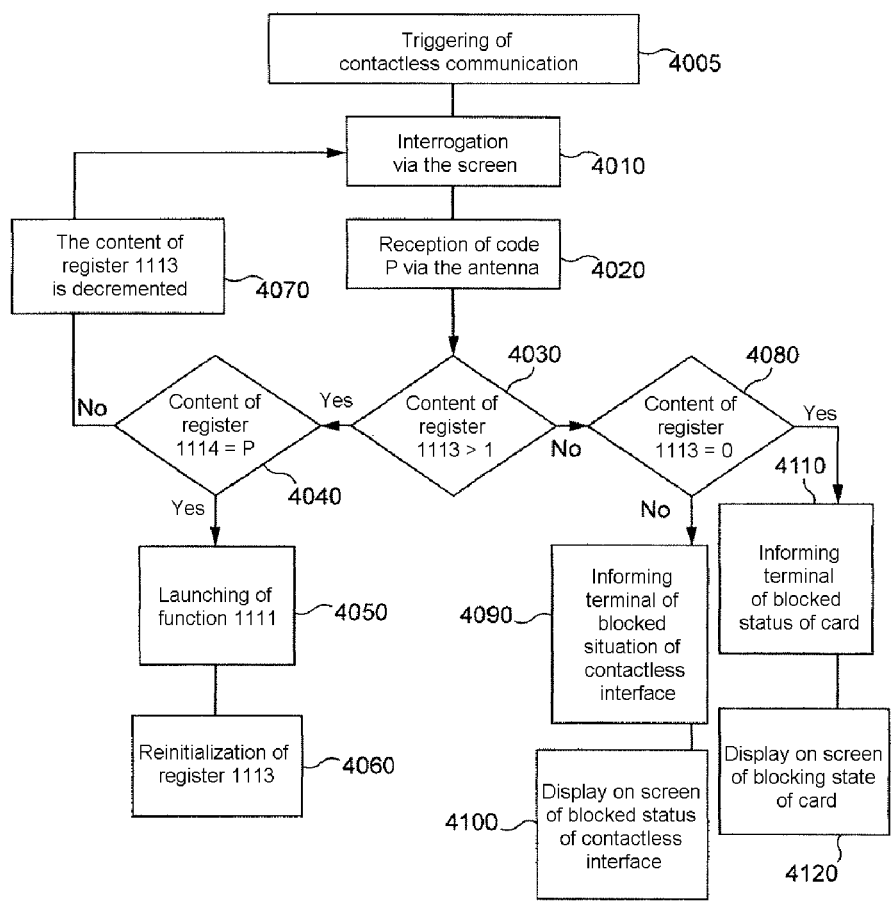
FIG. 4 represents steps of one embodiment of a method of the invention.

Referring to FIG. 4, the holder of the card 1000 uses the card at a terminal 2000 to carry out a contactless transaction via the antenna 1300 and the radio interface 2300. This process begins with a step 4005 of initiating near field communication between the card and the terminal.

During a step 4010, the contactless payment terminal 2000 displays on its screen 2400 a message requesting the user to enter their PIN. The user enters into the terminal a PIN value P using the keyboard 2500.

During a step 4020, the value P is sent to the operating system 1110 via the radio interface 2300 and the antenna 1300 in an APDU (application protocol data unit) command between a microcircuit card and an associated reader, as defined by the ISO 7816 standard. In the embodiment shown, this is the VERIFY PIN command (ISO 7816).

At this stage of the execution of the method, the application 1110 is in a position to take account of information to the effect that the value P was sent to it via the contactless interface 1300. This is possible if the program being executed (FIG. 4) is specific to the situation where the value P was sent via the contactless interface and is therefore separate from the program that is being executed when the value P was sent via the contact interface (see FIG. 5, as described below). The application 1110 therefore contains two subapplications 1110a and 110b.

Alternatively, the application 1110 can store information to the effect that the value P was sent via the contactless interface. This information, which can be Boolean or binary, can be stored in a random-access memory (PAM) or another volatile memory of the microcontroller 1100. It can be updated after the step 4005 or after the step 4020, and the program then includes, when necessary, test steps for verifying the value of this information.

During a step 4030, the application 1110 verifies if the content of the register 1113 is strictly greater than 1.

According to a variant, the application 1110 verifies if the content of the register 1113 is strictly greater than 2 or another predefined value if the counter is initialized to a value greater than 2.

If so, the application 1110 launches the verification application 1112 that compares the content of the register 1114 to P during a step 4040.

If the content of the register 1114 is equal to the value P, then the application 1110 launches the function 1111, during a step 4050, and the content of the register 1113 is reinitialized to the number of attempts authorized, during a step 4060. The number of attempts authorized is a value stored in a memory (read-only memory or volatile memory) of the microcontroller 1100, and that is not modified during execution of the method to which the invention relates.

To effect this reinitialization, the card 1000 therefore includes means (not shown) for initializing the content of the register 1113, which means can be included in the application 1110.

If the content of the register 1114 is different from P, then the application 1110 decrements the content of the register 1113 during a step 4070, after which it begins a new iteration of the algorithm that has just been described, commencing with the step of interrogation via the screen 4010.

If the content of the register 1113 is not strictly greater than 1, then the application 1100 effects a test step 4080 to find out if the content of the register 1113 is equal to 0.

If the content of the register 1113 is different from 0 (i.e. in normal conditions of use if it is equal to 1), the application 1110 sends, during a step 4090, the terminal 2000 via the antenna 1300 and the radio interface 2300 a "CONDITION OF USE NOT SATISFIED" APDU response conforming to the ISO 7816 standard, indicating to the terminal that the conditions for access by the APDU command previously used ("Verify PIN" via the contactless interface) are not satisfied.

The result for the user is the necessity to use the contact interface. The terminal then displays a message indicating to the user that the contactless interface has been deactivated, during a step 4100.

In one embodiment, the application 1110 stores in a memory of the microcontroller information indicating that the contactless interface is blocked or that access to the function 1111 via the contactless interface is prohibited. This preferably Boolean information item is stored in a rewritable non-volatile memory of the microcontroller 1100. In another embodiment, the content of the register 1113 serves as equivalent information, the fact that it is less than or equal to 1 being sufficient to indicate that the contactless interface is blocked.

Conversely, if the content of the register 1113 is equal to 0, then the application 1110, during a step 4110, sends the terminal 2000 via the antenna 1300 and the radio interface 2300 an "AUTHENTICATION METHOD BLOCKED" APDU response conforming to the ISO 7816 standard (this means that the use of the card is blocked by the security means, i.e. the code 1112, and that use of the function 1111 is blocked).

The terminal 2000 then displays a message on its screen indicating to the user that the card 1000 is blocked, during a step 4120.

In one embodiment, the application 1110 stores in a memory of the microcontroller 1100 information indicating that the card 1000 is blocked or that access to the function 1111 is prohibited, whatever interface is used. This preferably Boolean information is stored in a rewritable non-volatile memory of the microcontroller 1100. In another embodiment, the content of the register 1113 serves as equivalent information, the fact that it is less than or equal to 0 being sufficient to indicate that the card is blocked or that access to the function 1111 is prohibited, whatever interface is used.

Figure 5:
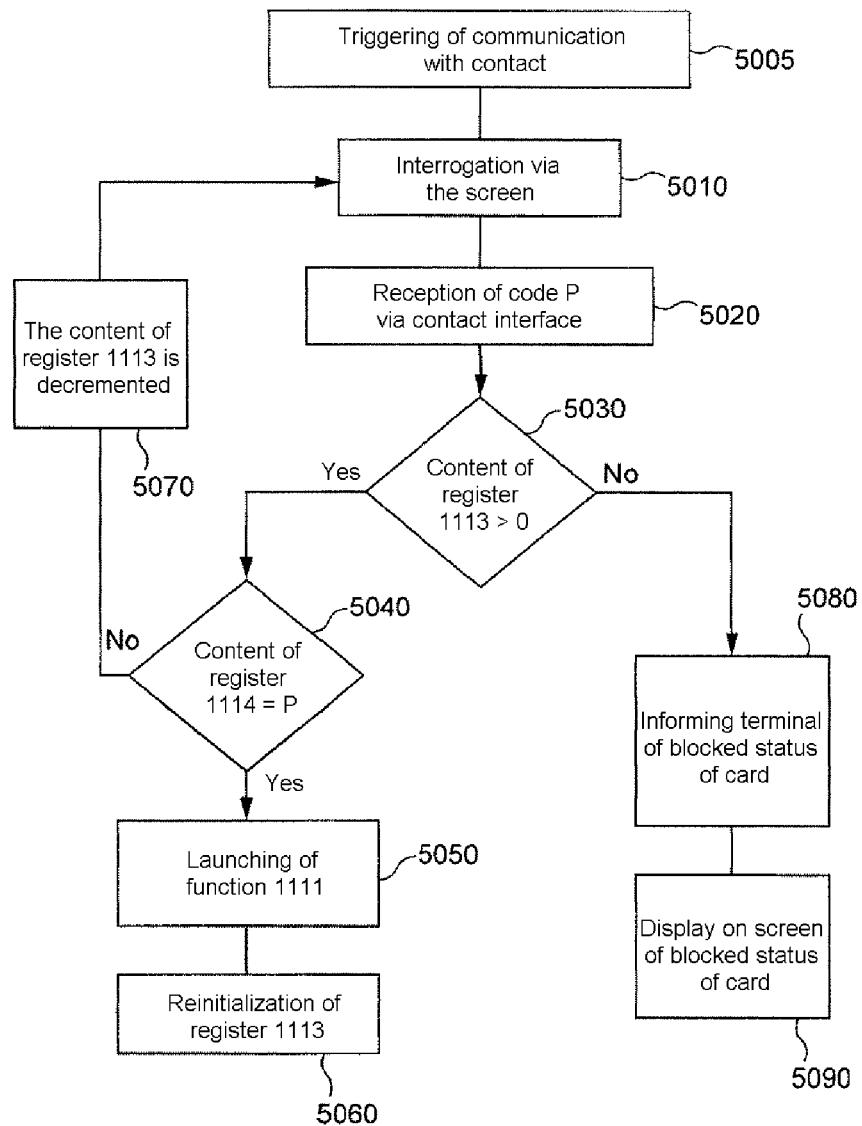
FIG. 5 represents steps executed in the event of certain uses of an electronic entity of the invention.

Referring to FIG. 5, the holder of the card 1000 uses the card at a terminal 3000 able to communicate with the card 1000 by contact in accordance with a standard compatible with the flush contacts 1200. The terminal 3000 can be the same terminal 2000 described above, for a different device.

The communication process begins with a step 5005 of triggering communication of the card and the terminal by contact.

During a step 5010, the terminal displays on its screen a message prompting the user to enter their PIN. The user enters into the terminal a PIN value P using the keyboard, and that value is sent to the microcontroller 1100 during a step 5020, via the flush contacts 1200.

At this stage of the execution of the method, the application 1110 is in a position to take account of the fact that the value P was sent to it via the contact interface 1200. As previously explained with reference to FIG. 4, this is possible if the program that is being executed (FIG. 5) is specific to the case where the value P was sent via the contactless interface, and is therefore separate from the program that is being executed when the value P was sent via the contact interface (FIG. 4).

Alternatively, the application 1110 can store information to the effect that the value P was sent to it via the contact interface 1200. As before, this information can be stored in a rewritable volatile memory, for example a RAM of the microcontroller 1100. It can be updated after the step 5005 or after the step 5020, depending on the embodiment.

During a step 5030, the application 1110 verifies if the content of the register 1113 is greater than the value 0.

If so, the application 1110 launches the verification code 1112 that compares the content of the register 1114 to the value P, during a step 5040.

If the result of this latter comparison is positive, i.e. if the content of the register 1114 is equal to the value P, then the application 1110 launches the function 1111, during a step 5050, and the content of the register 1113 is reinitialized to the maximum number of attempts authorized, which as explained above is contained and preserved unchanged in a memory of the microcontroller during normal use of the card 1000.

If the content of the register 1114 is different from P, then the operating system 1110 decrements the content of the register 1113 by one unit, during a step 5070.

If, during the step 5030, the application 1110 finds that the content of the register 1113 is not strictly greater than 0, then, during a step 5080, the application 1110 sends the terminal 3000 via the flush contacts 1200 an "AUTHENTICATION METHOD BLOCKED" APDU response.

The terminal 3000 then displays a message on its screen indicating to the user that the card 1000 is blocked, during a step 5090.

Accordingly, thanks to the method executed in the card, the latter is protected against a denial of service type attack at the contactless interface (the antenna 1300), since if the latter is attacked, communication via the antenna is blocked (steps 4090 and 4100) when the content of the register 1113 reaches 1, but communication via the flush contact is still possible.

In an alternative embodiment, the holder of the smart card is authenticated by the EXTERNAL AUTH command (ISO 7816).

In a further alternative embodiment, the module 1112 authenticates the user by means of a cryptography key (or other secret data) or biometric data such as a fingerprint.

In another embodiment, the register 1113 is not decremented during the steps 4070 and 5070, but incremented. In this case, the comparison steps 4030 and 5030, which are of the type "is the content of the register above a limit value?", are replaced by comparison steps of the type "is the content of the register below a limit value?".

In another embodiment, the register 1113 contains, instead of a value linked to the number of successive failures, a number of uses of the card since a certain date, or in a past period predefined relative to the time at which the content of the register is updated. The uses counted in this way can be attempts at authentication (leading to success or failure), or another form of use of the card 1000, of one of its functions, or an attempt at such use, on the understanding that use above a given frequency in this embodiment constitutes incorrect use of the card.

One form of use that is of interest in particular in the context of this variant is the use of a secret value, for example a cryptographic key stored in the memory of the microcontroller 1100, for example in the register 1114, this use being triggered by the reception of a command (for example an APDU command, conforming to the ISO 7816 standard) via the interface 1200 or 1300. The code 1112 effects encryption or decryption using the key, and the register 1113 is used to store a value linked to a count of decryption or encryption operations using the key, or of uses of the secret data.

Thus the content of the register 1113 can be used to evaluate the frequency of use over a defined time period. The frequency of use determined in this way is compared to a predetermined limit frequency of use value (for example 1000 uses in a defined time period). In this context, a large number of uses or a high frequency of use can be considered as characteristic of a differential power analysis (DPA) type attack, measured moreover by analysis of the power consumption of the card.

In another embodiment, the register 1113 contains instead of a value linked to the number of uses a value linked to the number of authentication failures since a certain date, or in a past period predefined relative to the time at which the register is updated.

Thus the content of the register can be used to evaluate the frequency of failure of authentication over a defined time period. The frequency determined in this way is compared to a predetermined authentication failure frequency limit value. If a first limit value is reached, only use of the contact interface is authorized. If a second limit value, higher than the first limit, is reached, the use of both interfaces is blocked.

In further alternative embodiments, after a failed attempt at authentication via the contactless interface 1300, the application 1110 does not send a blocking response to the terminal 2000 (in the step 4090), but effects a time-delay step of length T and modifies the content of a counter register (in a similar way to the step 4070), before proceeding to another iteration beginning with interrogation via the screen (similar to the step 4010) and involving an attempt (successful or failed, as a function of circumstances) at authentication, involving use of the verification module 1112.

In advantageous embodiments, the length T increases with the number of authentication failures in a reference period, determined by the content of a register, decremented (or incremented, depending on the implementation) on each authentication failure. Once again the reference period can be the period running from the last successful authentication.

The form of growth can be a multiplication of the value of T by a multiplication factor n on each failure, n being equal to 2 for example (i.e. exponential growth, also known as geometrical growth).

In a beneficial embodiment, after a failed attempt at authentication via the contactless interface 1300, the application 1110 is adapted to effect a time-delay step of length T as explained above and, after another failed attempt at authentication, this time via the contact interface 1200, also to effect a time-delay step of length T'.

The length time T' is then made different from the length T, for example twice as long, or three times as long. The length T' can also evolve exponentially, with the same multiplication factor as the length T, or in one embodiment with a higher multiplication factor.

In a further embodiment, the application 1110 is adapted to effect a time-delay step of length T as explained above, the length T increasing with the number of failures noted in a predefined time period. The application 1110 is also adapted, during a step similar to the step 4090 previously described, to send the terminal 2000 via the antenna 1300 and the radio interface 2300 a "CONDITION OF USE NOT SATISFIED" APDU response, conforming to ISO 7816, indicating that authentication via the contact interface 1200 is no longer functional.

In this embodiment, the application 1110 first effects time-delay steps and then, if the number of authentication failures exceeds a predetermined limit value—or threshold—denoted L, the application 1110 proceeds to deactivate the interface 1200, in the manner described. The limit L can take a value of 5, 6 or 10 occurrences, for example.

In this embodiment, it is also possible for authentication via the contact interface 1200 to remain authorized whatever the number of failures noted, but with time-delay steps of increasing duration between each interrogation of the user via the screen (step 5010) and the next.

The embodiments and alternative embodiments that have just been described merely constitute possible embodiments of the invention, which is not limited to them.

In particular, in alternative embodiments, the smart card 1000 is replaced by a USB (Universal Serial Bus) key, a communicating mobile terminal, a personal digital assistant or a passport. In some embodiments, this device conforms to the FIPS (Federal Information Processing Standards) or to the common criteria (CC) standard. In the case of a USB key, the flush contacts 1200 are those of a USB plug, for example.

The interfaces are different, but can both function with or without contact.

The invention claimed is:

1. An electronic device, comprising:
   a first interface configured to establish communication with an external electronic entity;
   a second interface configured to establish communication with the external electronic entity;
   means for processing a secret value, configured to react to reception of a message via any of the first interface and the second interface; and
   control means, configured
      to update an indicator of use of said means for processing the secret value via any of the first interface and the second interface,
      to apply a first inhibition to communication using the first interface as a function of said indicator, and
      to apply a second inhibition to communication using the second interface as a function of said indicator,
   wherein, for at least one value of the indicator, the second inhibition is different from the first inhibition, and
   wherein one of the first and second interfaces is a contact interface and an other of the first and second interfaces is a contactless interface.

2. The electronic device according to claim 1, wherein the means for processing the secret value include security means configured to authorize access to a function of the electronic device in reaction to a successful authentication.

3. The electronic device according to claim 2, wherein the indicator is a count of incorrect uses of the security means via any of the first interface and the second interface.

4. The electronic device according to according to claim 3, wherein at least one of the first inhibition and the second inhibition includes an application of a time-delay following incorrect use of the means for processing the secret value, communication with said means for using a secret value via the corresponding interface being delayed during said time-delay, and the time-delay increasing at an increasing rate with the count.

5. The electronic device according to claim 3, wherein each of the first inhibition and the second inhibition includes an application of a time-delay after incorrect use of the means for processing the secret value, communication with said means for processing the secret value via the corresponding interface being delayed during said time-delay, the time-delay increasing at an increasing rate with the count, and the time-delay applied at the second interface being at least twice the time-delay applied at the first interface for the count.

6. The electronic device according to claim 3, wherein at least one of the first inhibition and the second inhibition includes application of a time-delay following incorrect use of the means for processing the secret value, communication with said means for using the secret value via the corresponding interface being delayed during said time-delay and the time-delay increasing at an increasing rate with the count.

7. The electronic device according to claim 2, wherein the control means are further configured to update an indicator of incorrect use of said means for processing the secret value via any of the first interface and the second interface.

8. The electronic device according to claim 2, wherein the indicator is a count of incorrect uses of the security means via any of the first interface and the second interface.

9. The electronic device according to claim 2, wherein for at least one value of the indicator, communication using the second interface is blocked, but communication using the first interface is authorized.

10. The electronic device according to claim 2, wherein the control means are configured
    to apply said first inhibition if said indicator exceeds a first threshold, and
    to apply said second inhibition if said indicator exceeds a second threshold higher than the first threshold.

11. The electronic device according to claim 1, wherein the control means are further configured to update an indicator of incorrect use of said means for processing the secret value via any of the first interface and the second interface.

12. The electronic device according to claim 1, wherein for at least one value of the indicator, communication using the second interface is blocked, but communication using the first interface is authorized.

13. The electronic device according to claim 1, wherein the control means are configured
    to apply said first inhibition if said indicator exceeds a first threshold, and
    to apply said second inhibition if said indicator exceeds a second threshold higher than the first threshold.

14. The electronic device according to claim 1, wherein the second interface is more accessible to an attack than the first interface.

15. The electronic device according to claim 1, wherein the control means are configured to count successive failures of authentication, the electronic device being configured to initialize the indicator in reaction to detection of a successful authentication.

16. The electronic device according to claim 1, wherein the means for processing the secret value is configured to process a personal identification secret code.

17. The electronic device according to claim 1, wherein said second interface includes data receiving means using a contactless communication protocol.

18. The electronic device according to claim 1, wherein said first interface includes means for receiving data using a contact-based communication protocol.

19. The electronic device according to claim 1, wherein the electronic device is one of a smart card and a USB key.

20. A method for use in an electronic device having first and second interfaces and an information storage device having stored therein instructions to cause the electronic device to implement the steps of the method, the method comprising:
- counting uses of means for processing a secret value, up to a first counting threshold, via either of the first interface and the second interface, one of the first and second interfaces used being a contact interface, and an other of the first and second interfaces used is a contactless interface;
- inhibiting communication using the second interface;
- counting incorrect uses up to a second threshold, the second threshold being higher than the first threshold; and
- inhibiting communication using the first interface.

\* \* \* \* \*